United States Patent [19]

Takagi

[11] Patent Number: 4,750,072
[45] Date of Patent: Jun. 7, 1988

[54] THIN-FILM MAGNETIC HEAD PROVIDED WITH A MAGNETIC FILM HAVING REGIONS OF DIFFERENT MAGNETOSTRICTION CONSTANTS AND METHOD OF FABRICATING THE SAME

[75] Inventor: Masayuki Takagi, Odawara, Japan
[73] Assignee: Hitachi, Ltd., Tokyo, Japan
[21] Appl. No.: 828,348
[22] Filed: Feb. 11, 1986
[30] Foreign Application Priority Data
  Feb. 20, 1985 [JP] Japan ................... 60-32424
[51] Int. Cl.⁴ ................ G11B 5/127; G11B 5/147; G11B 5/187
[52] U.S. Cl. .................... 360/126; 360/122; 360/125
[58] Field of Search ............ 360/110, 113, 119, 122, 360/125–127; 29/603

[56] References Cited

U.S. PATENT DOCUMENTS

| | | | |
|---|---|---|---|
| 4,242,710 | 12/1980 | Hempstead et al. | 360/113 |
| 4,626,947 | 12/1986 | Narishige et al. | 360/126 |
| 4,631,613 | 12/1986 | French | 360/125 |

FOREIGN PATENT DOCUMENTS

| | | | |
|---|---|---|---|
| 57-203219 | 12/1982 | Japan | 360/113 |
| 60-147914 | 8/1985 | Japan | 360/113 |
| 60-224115 | 11/1985 | Japan | 360/113 |

Primary Examiner—Stuart N. Hecker
Assistant Examiner—Benjamin E. Urcia
Attorney, Agent, or Firm—Antonelli, Terry & Wands

[57] ABSTRACT

A thin-film magnetic head provided with a magnetic thin film having a magnetostrictive characteristic is disclosed in which a central part of magnetic core formed of the magnetic thin film has a positive magnetostriction constants, and side parts of the magnetic core on both sides of the central part have negative magnetostriction constants. Thus, when a stress due to the patterning of the magnetic core varies the magnetic characteristic of the magnetic core, the permeability of the magnetic core becomes high, and the magnetic stability thereof is improved. Accordingly, a signal reproduced by this magnetic head has a high output level, and is low in noise level.

16 Claims, 3 Drawing Sheets

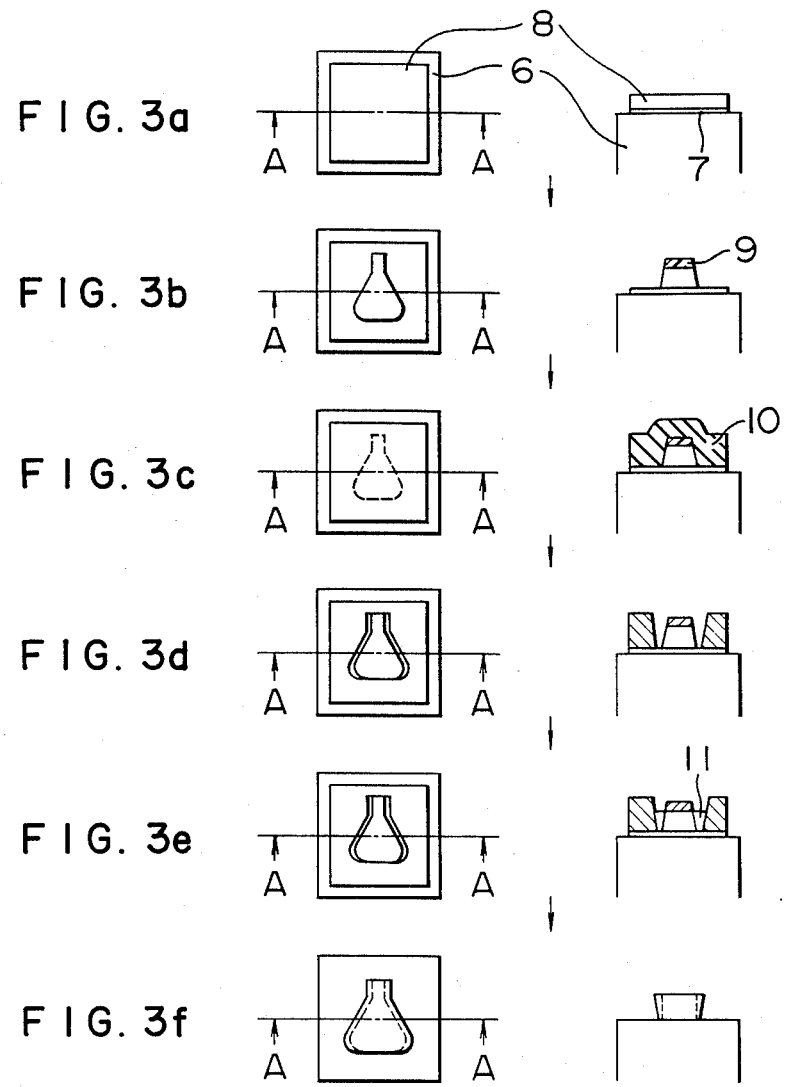
A-A SECTION

THIN-FILM MAGNETIC HEAD PROVIDED WITH A MAGNETIC FILM HAVING REGIONS OF DIFFERENT MAGNETOSTRICTION CONSTANTS AND METHOD OF FABRICATING THE SAME

BACKGROUND OF THE INVENTION

1. Field of the Invention

The present invention relates to a thin-film magnetic head, and more particularly to an inductive thin-film magnetic head whose magnetic core has large permeability and is excellent in magnetic stability.

2. Description of the Related Art

As the track pitch of magnetic disc drive has been made narrow, it has become very difficult to fabricate a thin-film magnetic head for high-density recording. For example, in order to develop a thin-film magnetic head having a track width of about 15 μm, it is necessary to put the magnetostriction constants of its magnetic core in a narrower range, as compared with the magnetic core of a conventional thin-film magnetic head having a track width of 25 to 30 μm. When the magnetostriction constants of the magnetic core are restricted within the narrower range, a process margin becomes very small, and thus some trouble may arise in mass producing a thin-film magnetic head.

The read and write characteristics of a thin-film magnetic head are greatly dependent upon the magnetic characteristics of a magnetic core included in the magnetic head. An inductive thin-film magnetic head is used in a high-frequency range, and hence the magnetic core of this magnetic head has high magnetic permeability in the high-frequency range, as mentioned below. That is, a magnetic core having uniaxial magnetic anisotropy is formed so that the easy axis of magnetization is parallel to the direction of the track width of the magnetic head, and a magnetic field is applied to the magnetic core in the direction of the hard axis of magnetization, to cause the reversion of magnetization by the revolution (namely, rotation) of magnetization, thereby increasing the magnetic permeability of the magnetic core in the high-frequency range. In such a thin-film magnetic head, however, the easy axis of magnetization is rotated by the magnetoelastic effect based upon a stress applied to the magnetic core and the magnetostriction constant of a magnetic film for forming the magnetic core, and thus it is impossible to maintain the predetermined magnetic anisotropy. Accordingly, the read and write characteristics of the magnetic head are degraded. As regards the above problem, a Japanese patent application (unexamined publication No. 55-101124) discloses that it is preferred to form a magnetic core of a magnetic film having a negative magnetostriction constant, since a tensile stress is applied to the magnetic core in a direction perpendicular to the direction of the track width of the magnetic core. Further, a Japanese patent application (unexamined publication No. 58-80120) discloses that a complicated stress is applied to a magnetic core, and hence it is preferred to form the magnetic core of a magnetic film having a magnetostriction constant whose absolute value is not greater than $1 \times 10^{-6}$. Similar techniques are disclosed in a U.S. patent application Ser. No. 460,658 filed on Jan. 24, 1983, now U.S. Pat. No. 4,626,947 which is incorporated herein by reference. According to the inventors' experiments, however, it has been confirmed that in a case where a magnetic core is formed of a magnetic film having a negative magnetostriction constants whose absolute value is large, when a tensile stress is applied to the magnetic core, the permeability thereof is reduced, and the read and write characteristics of a magnetic head including the (above-mentioned) magnetic core is degraded. Further, it has been confirmed by experiments that in a case where a magnetic head has a small track width suitable for high density recording and a magnetic core included in the magnetic head is formed of a magnetic film having a positive magnetostriction constant, even when the positive magnetostriction constant is less than $1 \times 10^{-6}$, the magnetic core is magnetically unstable, and thus the noise level in a signal reproduced by the magnetic head is high.

It is very difficult to control the magnetostriction constants of a magnetic film within a narrow range and to control a stress applied to the magnetic film Moreover, such processing will make the process margin small, and thus may cause some trouble in mass producing a magnetic head including the magnetic film.

SUMMARY OF THE INVENTION

An object of the present invention is to provide a thin-film magnetic head which can solve the above problems of the prior art, and can exhibit a stable, excellent read and write characteristics without being affected by the shape and fabrication process of a magnetic core and by a protective film provided on the magnetic head.

According to one aspect of the present invention, there is provided a thin-film magnetic head which includes a lower magnetic thin-film, an upper magnetic thin-film overlying the lower magnetic thin-film in such a manner that one end of the upper magnetic thin film contacts one end of the lower magnetic thin film and the other end of the upper magnetic thin film is separated from and faces the other end of the lower magnetic thin film through an insulating gap member to cooperatively constitute a magnetic circuit provided with a magnetic gap, and a coil conductor film extending between the upper and lower magnetic thin films intersect the magnetic circuit, and in which each of the upper magnetic thin film and the lower magnetic thin film is divided in a central region and a side region(s) which exist in the same plane, and the magnetostrictive characteristic of the central region is opposite in polarity to that of the side region.

BRIEF DESCRIPTION OF THE DRAWINGS

FIGS. 3a to 3f are views for explaining an embodiment of a method of fabricating an inventive thin-film magnetic core.

DESCRIPTION OF THE PREFERRED EMBODIMENTS

Now, the preferred embodiments of the present invention will be explained below in detail, by reference to the drawings.

Figure 1:
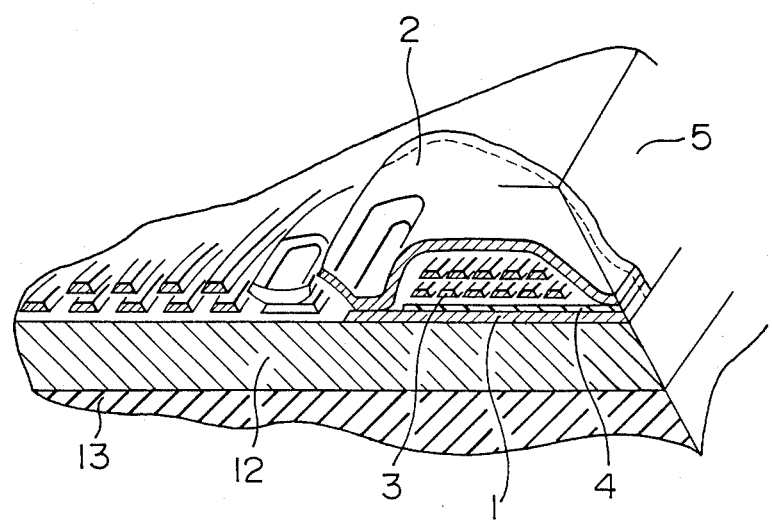
FIG. 1 is a perspective view showing a half of an embodiment of a thin-film magnetic head according to the present inventin, viewed from the cutting plane side.

FIG. 1 is a perspective view showing a half of an embodiment of a thin-film magnetic head according to the present invention, viewed from the cutting plane side.

In FIG. 1, reference numeral 13 designates an insulating substrate, 12 an underlying film formed on the insulating substrate 13, 1 a lower magnetic core formed on the underlying film 12, 2 an upper magnetic core which overlies the lower magnetic core 1 in such a manner that one end of the upper magnetic core is bonded to one end of the lower magnetic core 1 and the other end of the upper magnetic core faces the other end of the lower magnetic core 1 through a predetermined magnetic gap, 3 a coil conductor arranged so as to pass through a space surrounded by the lower magnetic core 1 and the upper magnetic core 2, 4 an insulating layer for forming the predetermined magnetic gap, and 5 a protective film covering the upper magnetic core 2 and the coil conductor 3.

Each of the lower magnetic core 1 and the upper magnetic core 2 is divided into a central region and a pair of side regions. It is to be noted that in FIG. 1, each of the magnetic cores 1 and 2 is divided by a broken line into the central region and one side region. In the present embodiment, the central region of each magnetic core is made of a magnetic material having a positive magnetostriction constants, and the side regions are made of another magnetic material having a negative magnetostriction constants. In each of the magnetic cores 1 and 2, the greater part of the whole area extending from one end of each magnetic core to the other end where the magnetic gap is formed, is occupied by the central region having the positive magnetostriction constants, and the side regions having the negative magnetostriction constants are very small in area, as will be explained later by reference to FIG. 2c.

That is, in the present embodiment, in order to make high the magnetic permeability of a magnetic core and to improve the magnetic stability thereof by utilizing the reverse magnetoelastic effect based upon a stress applied to the magnetic core and the magnetostriction constants thereof, each of the upper and lower magnetic cores is divided into a central region and a pair of side regions all existing in the same plane, and the central region is made opposite in polarity of magnetostrictive characteric to the side regions.

Referring to FIG. 1, the insulating substrate 13 is made of one of materials such as $Al_2O_3$-TiC ceramics, $Al_2O_3$-$TiO_2$ ceramics, SiC, Zn ferrite, Ni-Zn ferrite and Mn-Zn ferrite. An $Al_2O_3$ film may be deposited on the insulating substrate 13 by the sputtering method, to form the underlying film 12. Next, a Ni-Fe alloy film may be deposited on the underlying layer 12 by the sputtering method, to form the lower magnetic core 1. For example, the central region of the lower magnetic core 1 bounded on the outside by the broken line is formed of a film having positive magnetostriction constants less than or equal to $0.6 \times 10^{-6}$, and the side regions existing on both sides of the central region are formed of a film having negative magnetostriction constants greater than or equal to $-0.6 \times 10^{-6}$ (namely, negative magnetostriction constants whose absolute value is not greater than $0.6 \times 10^{-6}$). A Ni-Fe alloy film is polycrystalline, and the magnetostriction constants of a polycrystalline film is dependent on the degree of orientation of the film, since the magnetostriction constants of a monocrystalline film is determined by the crystallographic orientation thereof. In a case where a polycrystalline Ni-Fe alloy film is formed so that the greater part of crystals have a (111) crystallographic plane (or crystal face) parallel to the surface of the film, the magnetostriction constants of the film become zero, when the film contains about 80.2% Ni by weight. Further, in a case where a polycrystalline Ni-Fe film is formed so that the greater part of crystals have a (100) crystallographic plane parallel to the surface of the film, the magnetostriction constant of the film becomes zero, when the film contains about 81.7% Ni by weight. Accordingly, the magnetostriction constants of a Ni-Fe alloy film can be set to a desired value within a range from $-0.6 \times 10^{-6}$ to $+0.6 \times 10^{-6}$, by controlling the composition and the degree of orientation of the film.

Next, an $Al_2O_3$ film may be deposited on the lower magnetic core 1 by the sputtering method, to form the magnetic gap layer 4. A polyimide resin may be used for insulating the coil conductor 3. The coil conductor 3 may be made of copper by the sputtering method. Like the lower magnetic core 1, the upper magnetic core 2 may be made of a Ni-Fe alloy by the sputtering method so that the central region bounded on the outside by the broken line has positive magnetostriction constants less than or equal to $0.6 \times 10^{-6}$ and the side regions on both sides of the central region have negative magnetostriction constants greater than or equal to $-0.6 \times 10^{-6}$. The patterning of each of the lower magnetic core 1, the magnetic gap layer 4, the coil conductor 3 and the upper magnetic core 2 may be made by the ion-milling method. After connecting terminals have been formed by the plating method, the protective film 5 may be made of $Al_2O_3$ by the sputtering method. Another embodiment of a method of fabricating an inventive thin-film magnetic head will be explained later.

Figure 2A:
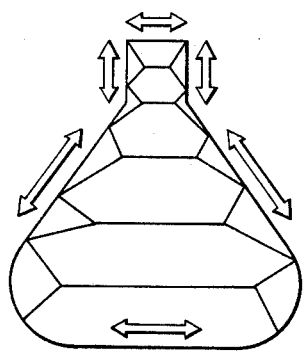
FIGS. 2a and 2b are schematic views showing the domain structure of conventional magnetic cores.
Figure 2B:
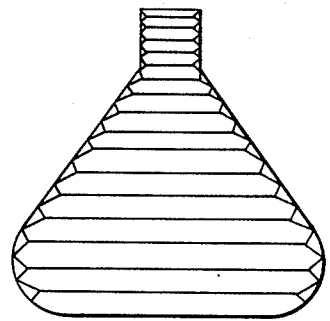
Figure 2C:
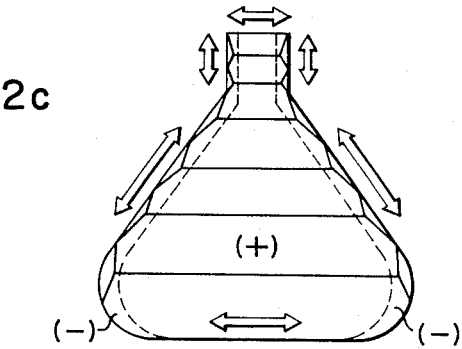
FIG. 2c is a schematic view showing the domain structure of a magnetic core included in the embodiment of FIG. 1.

FIGS. 2a, 2b and 2c show the stress distribution and magnetic domain structure (hereinafter simply referred to as "domain structure") at conventional magnetic cores and the magnetic core of FIG. 1. In more detail, each of FIGS. 2a to 2c shows the stress distribution and domain structure in a plane parallel to the substrate of magnetic head, FIGS. 2a and 2b correspond to the conventional magnetic cores, and FIG. 2c corresponds to each of the upper magnetic core and lower magnetic core of the present embodiment.

When a magnetic thim film is subjected to patterning to form a magnetic core, a tensile stress is applied to the magnetic core as indicated with arrows in FIGS. 2a and 2c. That is, a tensile stress is applied to a peripheral portion of the magnetic core in a direction parallel to the periphery thereof.

When a magnetic thin film having magnetostriction constants of $+0.6 \times 10^{-6}$ is shaped into a magnetic core, the magnetic core has a domain structure shown in FIG. 2a. In this case, since the magnetic thin film has positive magnetostriction constants, the easy axis of magnetization is readily rotated at the peripheral portion of the magnetic core by the above-mentioned tensile stress. Accordingly, a large 90° domain region is formed, and moreover each 180° domain region has a large area, as shown in FIG. 2a. The permeability of a magnetic core with such a domain structure can be determined by calculation, and is about 2,000. When a magnetic thin film having magnetostriction constants of $-0.5 \times 10^{-6}$ is shaped into a magnetic core, the magnetic core has a domain structure shown in FIG. 2b. In this case, since the magnetic thin film has negative magnetostriction constants, a very small 90° domain region is formed on the basis of the above-mentioned tensile stress, and each 180° domain region is small in area, as shown in FIG. 2b. The permeability of a magnetic core with such a domain structure can be determined by calculation, and is about 500.

The read and write characteristics of a magnetic head having the magnetic core of FIG. 2a and that of a magnetic head having the magnetic core of FIG. 2b were measured. The output level of a signal reproduced by the magnetic head having the magnetic core of FIG. 2b was about 20% lower than the output level of a signal reproduced by the magnetic head having the magnetic core of FIG. 2a. Further, the noise level of the signal reproduced by the magnetic head having the magnetic core of FIG. 2a was higher than the noise level of the signal reproduced by the magnetic head having the magnetic core of FIG. 2b. This is because the magnetic core of FIG. 2a is large in area of 90° domain region, and thus is inferior in magnetic stability to the magnetic core of FIG. 2b.

FIG. 2c shows the domain structure of each of the upper and lower magnetic cores of the present embodiment. The central region of each magnetic core has positive magnetostriction constants, and the side regions have negative magnetostriction constants. Thus, the magnetic permeability of the magnetic core is high, and the 90° domain region at the peripheral portion of the magnetic core is very small in area, as shown in FIG. 2c. Accordingly, the output level of a signal reproduced by the present embodiment having the magnetic core of FIG. 2c was nearly equal to the output level of a signal reproduced by the magnetic head having the magnetic core of FIG. 2a, and moreover the noise level of the signal reproduced by the present embodiment was nearly equal to that of a signal reproduced by the magnetic head having the magnetic core of FIG. 2b.

FIGS. 3a to 3f are plan and sectional views for explaining an embodiment of a method of fabricating an inventive thin-film magnetic core. In this embodiment, a magnetic thin film is formed by the plating method. At first, as shown in FIG. 3a, an underlying layer 7 for plating is formed on an insulating substrate 6, and then a magnetic thin film 8 is formed on the whole surface of the underlying layer 7 by plating, so as to have positive magnetostriction constants. next, as shown in FIG. 3b, the magnetic thin film 8 is etched so as to have a shape which is similar to and a little smaller than a lower magnetic core, by using a negative resist 9. Then, as shown in FIG. 3c, the whole surface is coated with a positive resist 10. Thereafter, as shown in FIG. 3d, only those portions of the positive resist 10 which correspond to side regions of the lower magnetic core, are removed. Then, as shown in FIG. 3e, a magnetic layer serving as the side regions 11 of the lower magnetic core is formed by the masked plating method, so as to have negative magnetostriction constants. At this time, the width of each side region is made equal to about 30% of the total width of that end portion of the lower magnetic core which defines the track width of magnetic head. Finally, as shown in FIG. 3f, the negative resist, the positive resist and the underlying layer for plating are successively removed, to obtain the lower magnetic core. An upper magnetic core can be formed in the same manner as the lower magnetic core. Although a magnetic thin film has been formed by the plating method in the above embodiment, the magnetic thin film may be formed by the sputtering method or the evaporation method.

As explained in the foregoing, although the magnetic characteristic of a magnetic core used in a thin-film magnetic head is varied by a stress applied to the magnetic core, the present invention can prevent a reduction in output level of a reproduced signal and an increase in noise level of the reproduced signal which are both caused by the above variation in magnetic characteristic of a magnetic core. Further, according to the present invention, the magnetostriction constants of a magnetic core are not required to be controlled within a narrow range, and hence the process margin in fabricating a thin-film magnetic core can be made large.

What is claimed is:

1. A thin-film magnetic head comprising:
   a lower thin film made of a magnetic material;
   an insulating member formed on an end portion of said lower thin film;
   an upper thin film made of a magnetic material and overlying said lower thin film and said insulating gap member, one end of said upper thin film being bonded to one end of said lower thin film, the other end of said upper thin film and the other end of said lower thin film facing each other through said insulating member to form a magnetic gap, each of said lower thin film and said upper thin film being divided into a central region and a side region existing in substantially the same plane, said central region having one of a positive magnetostriction constant and a negative magnetostriction constant, said side region having the other magnetostriction constant; and
   a thin-film coil conductor disposed so as to pass through a space surrounded by said upper and lower thin films.

2. A thin-film magnetic head according to claim 1, wherein said positive magnetostriction constant is less than or equal to $0.6 \times 10^{-6}$, and said negative magnetostriction constant is greater than or equal to $-0.6 \times 10^{-6}$.

3. A thin-film magnetic head according to claim 1, wherein the central region of each of said upper and lower thin films has said positive magnetostriction constants, and the side region of each of said upper and lower thin films has said negative magnetostriction constants.

4. A thin-film magnetic head according to claim 3, wherein said upper and lower thin films are made of a Ni-Fe alloy.

5. A thin-film magnetic head according to claim 1, wherein in each of said upper thin film and said lower thin film, said central region is different in composition from said side region.

6. A thin-film magnetic head comprising:
   an insulating substrate;
   a lower thin-film magnetic core formed on said insulating substrate, having a central part and side parts existing in substantially the same plane and made of a Ni-Fe alloy, central part of said lower thin-film magnetic core said extending from one end thereof where a magnetic gap is formed to the other end opposite to said one end and having positive magnetostriction constants, said side parts of said lower thin-film magnetic core existing on both sides of said central part and having negative magnetostriction constants;
   a coil conductor and an insulator both formed on said lower thin-film magnetic core; and
   an upper thin-film magnetic core made of a Ni-Fe alloy, having a central part and side parts existing in substantially the same plane and extended on said coil conductor and said insulator in such a manner that said one end of said lower thin-film magnetic core and one end of said upper thin-film magnetic core face each other through said insulator to form said magnetic gap, and the other end of said upper thin-film magnetic core is kept in contact with the other end of said lower thin-film magnetic core, said central part of said upper thin-film magnetic core extending from said one end to said other end thereof and having positive magnetostriction constants, said side parts of said upper thin-film magnetic core existing on both sides of said central part and having negative magnetostriction constants.

7. A thin-film magnetic head according to claim 6, wherein the absolute value of each of said positive magnetostriction constants and said negative magnetostriction constants lies in a range from zero to $0.6 \times 10^{-6}$.

8. A thin-film magnetic head according to claim 6, wherein said insulating substrate includes an insulating plate which is made of at least one material selected from a group consisting of $Al_2O_3$-TiC ceramics, $Al_2O_3$-$TiO_2$ ceramics, SiC, Zn ferrite, Ni-Zn ferrite, and Mn-Zn ferrite, and an $Al_2O_3$ film formed on said insulating plate.

9. A thin-film magnetic head according to claim 6, wherein said coil conductor is made of copper.

10. A thin-film magnetic head according to claim 6, wherein said insulator includes an $Al_2O_3$ film for forming said magnetic gap and a polyimide layer for insulating said coil conductor.

11. A method of fabricating a thin-film magnetic head, comprising the steps of:

forming a central region of a lower thin-film magnetic core on an underlying layer, said central region of said lower thin-film magnetic core having one of positive magnetostriction constants and negative magnetostriction constants;

forming side regions of said lower thin-film magnetic core in substantially the same plane and on both sides of said central region of said lower thin-film magnetic core, said side regions of said lower thin-film magnetic core having the other magnetostriction constants;

forming an insulating magnetic-gap layer on an end portion of said lower thin-film magnetic core;

forming a coil conductor above said lower thin-film magnetic core, said coil conductor being buried in an insulator; and forming a central region of an upper magnetic core, said central region having one of positive magnetostriction constants and negative magnetostriction constants;

forming side regions of said upper thin-film magnetic core in substantially the same plane and on both sides of sides of said central region of said upper thin-film magnetic core, said side regions of said upper thin-film magnetic core having the other magnetostriction constants;

wherein said upper thin-film magnetic core is formed in such a manner that one end of said upper thin-film magnetic core is kept in contact with one of said lower thin-film magnetic core, the other end of said upper end thin-film magnetic core and the other end of said lower thin-film magnetic core face each other through said insulating magnetic-gap layer, and part of said coil conductor is surrounded by said upper and lower thin-film magnetic cores through said insulator.

12. A method of fabricating a thin-film magnetic head according to claim 11, wherein the step of forming said lower thin-film magnetic core and the step of forming said upper thin-film magnetic core include a step of making a thin film of a magnetic material through sputtering techniques.

13. A method of fabricating a thin-film magnetic head according to claim 11, wherein the step of forming said lower thin-film magnetic core and the step of forming said upper thin-film magnetic core include a step of making a thin film of a magnetic material through plating techniques.

14. A method of fabricating a thin-film magnetic head according to claim 11, wherein the step of forming said lower thin-film magnetic core and the step of forming said upper thin-film magnetic core include a step of forming said central region and said side region by different processes.

15. A method of fabricating a thin-film magnetic head according to claim 12, wherein the step of forming said insulating magnetic-gap layer includes a step of forming an insulating layer by sputtering, and the step of forming said coil conductor includes a step of forming a metal film by sputtering.

16. A method of fabricating a thin-film magnetic head according to claim 14, wherein said central region is made of a first Ni-Fe alloy, and said side region is made of a second Ni-Fe alloy which is different in composition from said first Ni-Fe alloy.

* * * * *